United States Patent [19]
Young et al.

[11] Patent Number: 5,350,199
[45] Date of Patent: Sep. 27, 1994

[54] SECURITY FACSIMILE PAPER

[76] Inventors: Aurelia G. Young, 60 Maywood, Pleasant Ridge, Mich. 48069; Peter A. Hochstein, 2966 River Valley Dr., Troy, Mich. 48098

[21] Appl. No.: 122,696

[22] Filed: Sep. 17, 1993

[51] Int. Cl.⁵ .............................. B42D 15/00
[52] U.S. Cl. ........................ 283/91; 283/94
[58] Field of Search .................. 283/91, 902, 94

[56] References Cited

U.S. PATENT DOCUMENTS

| | | |
|---|---|---|
| 2,396,833 | 3/1946 | D'Humy . |
| 4,436,377 | 3/1984 | Miller ..................... 283/91 X |
| 4,573,409 | 3/1986 | Clar et al. . |
| 4,582,346 | 4/1986 | Caprio et al. . |
| 4,853,256 | 8/1989 | Obringer et al. . |
| 4,896,355 | 1/1990 | Iggulden et al. . |
| 4,912,761 | 3/1990 | Tan et al. . |
| 5,001,749 | 3/1991 | Iggulden et al. . |
| 5,085,469 | 2/1992 | Castro .................... 283/100 X |
| 5,178,420 | 1/1993 | Shelby . |
| 5,184,849 | 2/1993 | Taylor ..................... 283/902 X |
| 5,301,981 | 4/1994 | Nesis . |

FOREIGN PATENT DOCUMENTS 2178093 11/1990 Japan .
9003277 4/1990 PCT Int'l Appl. ............... 283/94

*Primary Examiner*—Mark Rosenbaum
*Assistant Examiner*—Frances Han
*Attorney, Agent, or Firm*—Reising, Ethington, Barnard, Perry & Milton

[57] ABSTRACT

A printing medium (10) receives and displays images produced by a thermal printer of a standard facsimile machine. The printing medium (10) comprises plain-surfaced printing paper (12) and a cover medium (14) disposed over the printing paper so as to pass through the facsimile machine in combination with the printing paper. The cover medium (14) includes a bottom surface facing toward the printing paper (12) and a top surface facing away from the printing paper. A coating of heat-transferable ink (16) is disposed on the bottom surface, the ink being transferred from the cover medium (14) to predetermined locations on the printing paper (12) as the printing medium passes through the facsimile machine. The top surface of the cover medium (14) includes a speckled film (18) of reflective material for scattering light reflecting from the film to prevent the reading of images produced in the cover medium (14) and the printing paper (12) by the facsimile machine until the cover medium is separated from the printing paper by the intended recipient.

10 Claims, 2 Drawing Sheets

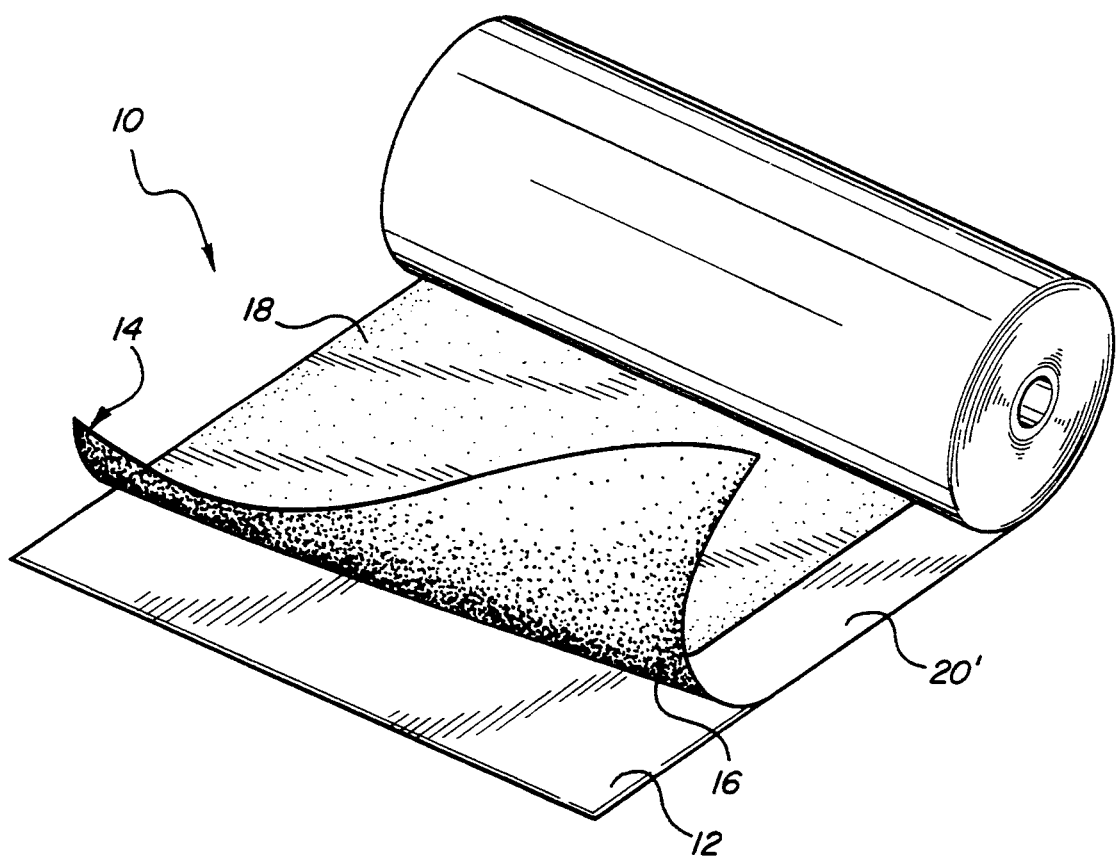

SECURITY FACSIMILE PAPER

TECHNICAL FIELD

The subject invention relates to facsimile transmission systems and more particularly to print media for use in facsimile machines along with methods for using such print media which effectively prevent unauthorized persons from reading images printed on the print media.

BACKGROUND OF THE INVENTION

Security facsimile paper serves to prevent unauthorized persons from reading information printed on a facsimile transmission. U.S. Pat. No. 5,001,749 to Iggulden et al. teaches a commonly used facsimile security paper. The paper includes a lower layer of plain white paper. This is the medium on which the images from the facsimile machine are most clearly printed, and is indeed the medium to be read by the intended recipient. A cover medium of thin polyester or other material is disposed over the plain paper before and during the printing by the facsimile machine. The cover medium should be removed only by the intended recipient of the facsimile transmission. The cover medium includes a bottom surface facing and contacting the plain paper. This bottom surface is coated with a wax-based or resin-based ink which melts onto specific locations on the plain paper in response to heating from the print head of the facsimile machine. This process forms letters and other symbols or images on the paper. The cover medium includes a top surface facing away from the plain paper. Thus, the cover functions like a ribbon of the type used in old typewriters. Unfortunately the cover medium, like a ribbon, can be read after imprinting—though with some difficulty. Iggulden attempts to overcome this problem by overprinting the top surface with an interference pattern of inked letters or the like for purposes of obscuring what has been printed on the plain paper through the cover medium.

Overprinting an inked interference pattern on the top surface of the cover medium has two main disadvantages: first, if the ink is thick enough to produce an obscuring effect, the ink will interfere with the thermal printing process and a ghost image of the overprinted interference pattern will appear on the images printed on the plain paper; moreover, overprinting with an ink-based interference pattern is not very effective in obscuring what has been printed on the cover medium and the plain paper. This is because the process of melting ink from the cover medium to the paper at localized spots creates a differential reflectivity. At the same time, the thermal print head deforms the cover medium somewhat in the same localized spots. This two-fold "marking" of the cover medium renders it readable in certain lighting conditions. In such conditions, an unauthorized person can still read—though with some difficulty—what has been printed on the sandwich of plain paper and cover medium, regardless of any ink overprinting.

SUMMARY OF THE INVENTION AND ADVANTAGES

A printing medium is disclosed for receiving and displaying images produced by a thermal printer of a standard facsimile machine. The printing medium comprises: a sheet of plain-surfaced printing paper receivable by the facsimile machine for passage therethrough past the thermal printer thereof; and a sheet of cover medium disposed over the printing paper so as to pass through the facsimile machine in combination with the printing paper. The cover medium includes a bottom surface facing toward the printing paper and a top surface facing away from the printing paper. An ink coating means is disposed on the bottom surface of the cover medium for being transferred from the cover medium to a predetermined location on the printing paper in response to heat applied by the facsimile machine as the printing medium passes through the facsimile machine.

The printing medium is characterized by the top surface of the cover medium including scattering means for scattering light reflecting from the scattering means to prevent the reading of images produced in the cover medium and the printing paper by the facsimile machine until the cover medium is separated from the printing paper.

The invention also includes the characterizing method step of scattering light approaching and travelling away from the surface of the cover medium to prevent persons from reading information imposed through the cover medium and onto the print medium as long as the cover medium covers the print medium.

By using a speckled film of metallic material as the scattering means, one can effectively prevent an unauthorized person from reading images printed on the sandwich of plain paper and the cover medium. Moreover, only a very thin layer of the speckled material is needed. The metallic film is thinner than the ink overprinting by an order of magnitude: the ink is typically on the order of 0.1 microns thick; whereas the metallic film is typically only 0.01 microns thick. Thus, this speckled film which serves as an effective security screen will not significantly interfere with the thermal printing process of the facsimile machine.

FIGURES IN THE DRAWINGS

Other advantages of the present invention will be readily appreciated as the same becomes better understood by reference to the following detailed description when considered in connection with the accompanying drawings wherein:

FIG. 3 is a perspective view of another embodiment of the subject invention.

DESCRIPTION OF THE PREFERRED EMBODIMENT

Figure 1:
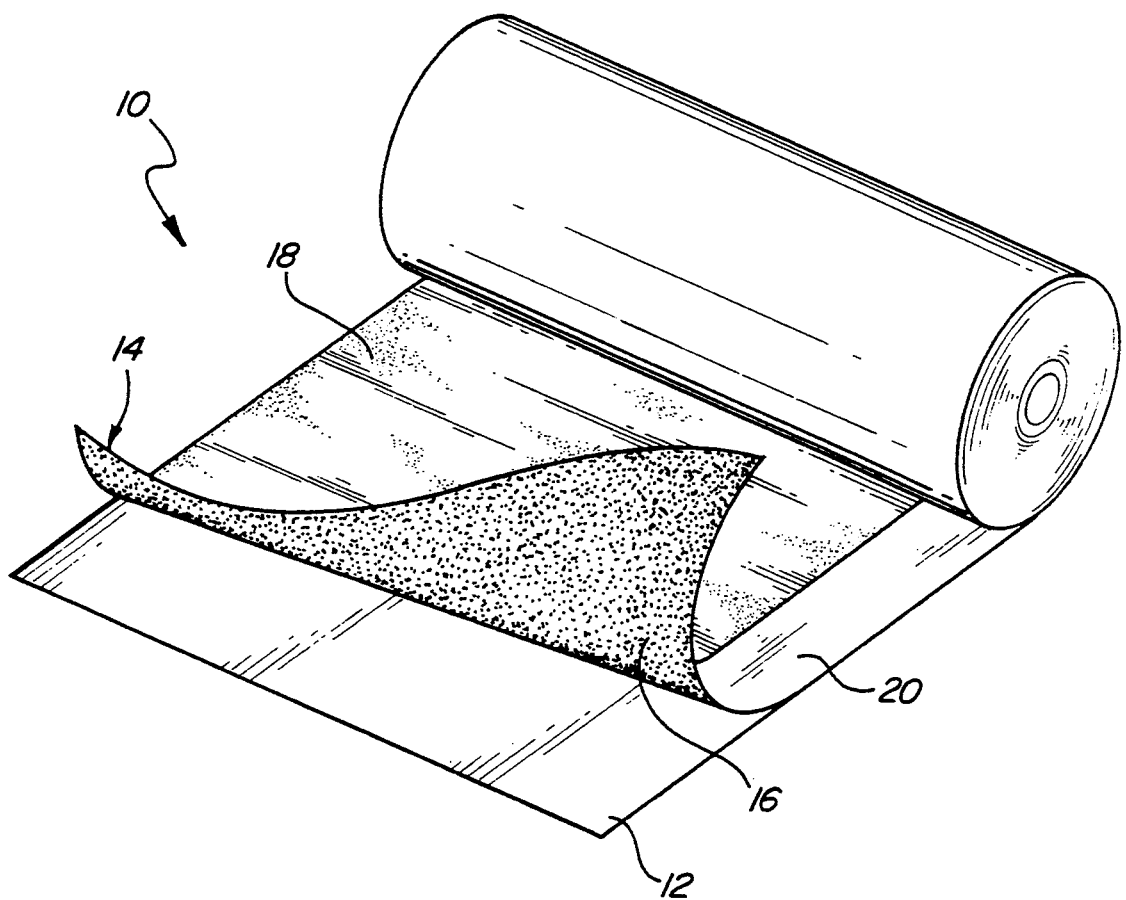
FIG. 1 is a perspective view one embodiment of the subject invention showing the cover medium slightly separated from the printing paper.
Figure 2:
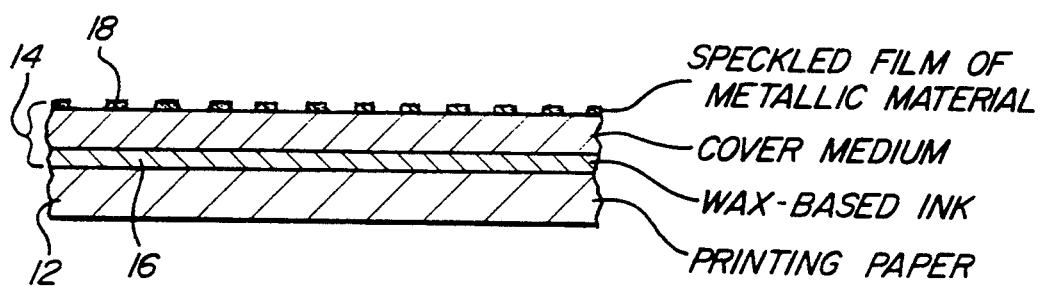
FIG. 2 is a simplified drawing depicting the constituent layers of the subject printing medium.

Referring to the Figures wherein like numerals indicate like or corresponding parts throughout the several views, a facsimile or FAX printing medium is generally shown at 10.

The printing medium 10 receives and displays images produced by a thermal printer of a standard facsimile machine. The printing medium 10 comprises: a sheet of plain-surfaced printing paper 12 receivable by the facsimile machine for passage therethrough past the thermal printer thereof; and a sheet of cover medium 14 disposed over the printing paper 12 so as to pass through the facsimile machine in combination with the printing paper. The printing medium 10 is essentially a sandwich of the printing paper 12 and the cover medium 14. The cover medium 14 includes a bottom surface facing toward and contacting the printing paper 12 and a top surface facing away from the printing paper. The cover medium 14 also includes ink coating means 16 disposed on the bottom surface of the cover medium for being transferred from the cover medium to a predetermined location on the printing paper 12 in response to heat applied by the facsimile machine as the printing medium passes through the facsimile machine. The ink coating means 16 is a heat transferrable ink. The printing medium 10 is characterized by the top surface of the cover medium 14 including scattering means 18 for scattering light reflecting from the scattering means to prevent the reading of images produced in the cover medium 14 and the printing paper 12 by the facsimile machine until the cover medium is separated from the printing paper.

The scattering means 18 includes a speckled or discontinuous film of reflective material disposed on the top surface of the cover medium 14. The reflective material is preferably metallic in composition. Vapor depositing of metallic film is well-known in the manufacturing of mirrors and toys such as metallic balloons, for example. Aluminum is typically employed as the metal. This well-known technique of vapor depositing is used with slight modification in the present invention to place the speckled film 18 on the cover medium 14. The modification consists in using a stencil or other means to create the speckled or discontinuous quality to the film. In other words, the metallic material flecks the cover medium 14 either randomly or according to a predetermined design. Said another way, the film consists of a multitude of spaced apart particles of reflective material. Obviously, the speckled material 18 should be concentrated enough in terms of specks per unit area to obscure the portions of the printing medium 10 with the images or letters imposed thereon. A continuous or unbroken sheet of the reflective metallic material is not desired because such a sheet or film will not prevent unauthorized reading. The film 18 is applied in a thickness of about 0.01 microns or thinner. Sometimes the film can be on the order of 0.001 microns in thickness.

The cover medium 14 is a polyester film such as that sold under the trademark MYLAR, or other film as is typically used in the FAX cover medium art. Other materials such as that sold under the trademark NYLON, and even paper may be used as the cover medium 14. The ink 16 which coats the first surface of the cover medium 14 is a wax-based or resin-based, thermally-sensitive ink as is also typically used in the FAX cover medium art.

Providing an address window on security FAX paper poses a problem which has persisted until the present. The person initially receiving the FAX is often a mail clerk or secretary and thus not the person for whom the confidential note is intended. Because the mail clerk or other person needs to know for whom the FAX is intended, there must be a portion on the printing medium 10 which displays the address. The prior art, such as in Japanese Patent 2-178093 to Isshiki, teaches placing a discrete address window on the surface of the cover medium 14 at predetermined intervals along the roll of printing medium 10, i.e the sandwich of cover medium and printing paper 12. However, thermal FAX machines do not cut paper in uniform sizes, so the position of the window may not correspond to where the address is printed.

To overcome this alignment problem, there is provided a cover medium 14 including oppositely disposed right and left edges, where the cover medium 14 further includes address means 20,20' disposed along the right edge for receiving and displaying an image from the facsimile machine. The address means 20,20' has several embodiments. In one embodiment the cover medium includes a continuous strip 20 having a coating of thermally activatable material for producing images on the strip in response to localized heating from the thermal printer. The strip 20 is preferably disposed adjacent the right edge of the cover medium 14 along the entire length of the cover medium; however, the strip 20 may be disposed elsewhere—e.g. along the left edge. This thermally activatable material is the same one ply "paper" as that used in the FAX machines which cause images to be created in the "paper" without using an overlaying thermally sensitive cover medium 14 of the type used in the present invention.

The strip 20 can be disposed on either the top or bottom surface of the cover medium 14. By placing the strip 20 on the cover medium, one effectively creates an address display.

An alternative way to provide for an address display involves simply not coating the rightmost portion of the cover medium 14 with the speckled reflective film. In other words, there is a strip 20' at the right edge which is devoid of the scattering means 18. Of course, the strip 20' may be disposed along the left edge instead. Preferably, one should create a strip 20' approximately one inch wide to leave enough room for an address. As one skilled in the art will appreciate, this method of providing for an address strip 20' is not as effective as the method disclosed above and involving the thermally sensitive coating strip 20 because the address in the strip 20' is not as easily read.

The addressing means as taught in the various embodiments 20,20' above is in all cases a continuous vertical strip extending along the entire length of the cover medium 14. Thus, the address can be printed at any location along the cover medium 14. The problem of aligning the address and the window for the address is therefore obviated. This is particularly advantageous because, as noted above, the cover medium 14 and the underlying paper usually come in continuous roll form rather than in discrete sheets.

The corresponding method for protecting confidential information printed on a print medium such as the printing paper 12 disclosed above includes the steps of: feeding the print medium 12 and the cover medium 14 though a printing machine with the cover medium disposed over and covering the print medium; imposing printed information through the cover medium 14 and onto the print medium 12 as the cover medium and print medium pass together through the printing machine; and scattering light approaching and travelling away from the surface of the cover medium 14 to prevent persons from reading information imposed through the cover medium 14 and onto the print medium 12 as long as the cover medium covers the print medium. Of course, the scattering effect is produced by the step of placing the reflective film 18 on the top surface of the cover medium 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A printing medium (10) for receiving and displaying images produced by a thermal printer of a standard facsimile machine comprising:

a sheet of plain-surfaced printing paper (12) receivable by the facsimile machine for passage therethrough past the thermal printer thereof;

a sheet of cover medium (14) disposed over said printing paper (12) so as to pass through the facsimile machine in combination with said printing paper, said cover medium (14) including a bottom surface facing toward said printing paper and a top surface facing away from said printing paper;

an ink coating means (16) disposed on said bottom surface of said cover medium (14) for being transferred from said cover medium to a predetermined location on said printing paper (12) in response to heat applied by the facsimile machine as the printing medium (10) passes through the facsimile machine;

characterized by said cover medium (14) including scattering means (18) for reflecting and scattering light travelling to and away from said cover medium (14) to create a diffuse non-specular reflection and thereby prevent the reading of images produced in said cover medium and said printing paper (12) by the facsimile machine until said cover medium is separated from said printing paper.

2. The printing medium (10) as set forth in claim 1 further characterized by said cover medium (14) being made from one of a transparent and an opaque material, said scattering means (18) including specks of reflective material disposed across said cover medium (14) in spaced apart and coplanar relationship to create a layer of discontinuous reflecting surfaces.

3. The printing medium (10) as set forth in claim 2 further characterized by said speckled film (18) including metallic material.

4. The printing medium (10) as set forth in claim 1 further characterized by said film (18) being on the order of 0.001 to 0.01 microns in thickness.

5. The printing medium (10) as set forth in claim 1 further characterized by said cover medium (14) including oppositely disposed right and left edges, said cover medium (14) further including address means (20,20') disposed along said right edge for receiving and displaying an image from the facsimile machine.

6. The printing medium 910) as set forth in claim 5 further characterized by said address means (20,20') including a strip (20) having a coating of thermally activatable material for producing images on said strip in response to localized heating from the thermal printer, said strip (20) being disposed continuously along said right edge of said cover medium (14).

7. The printing medium (10) as set forth in claim 6 further characterized by said strip (20) being disposed on one of said top and bottom surfaces of said cover medium (14).

8. The printing medium (10) as set forth in claim 5 further characterized by said address means (20,20') including a margin strip (20') disposed continuously along said right edge of said cover medium (14), said margin strip (20') being devoid of said scattering means (18) to allow the reading of images printed through said margin strip by said thermal printer.

9. A method for protecting confidential information printed through a cover medium (14) and onto a print medium (12) including the steps of:

feeding the print medium (12) and the cover medium (14) though a printing machine with the cover medium disposed over and covering the print medium;

imposing printed information through the cover medium (14) and onto the print medium (12) as the cover medium and print medium pass together through the printing machine; and characterized by scattering light approaching and travelling away from the cover medium (14) to create a diffuse non-specular reflection and thereby prevent persons from reading information imposed through the cover medium (14) and onto the print medium (12) as long as the cover medium covers the print medium.

10. A method as set forth in claim 9, further characterized by placing a speckled film of reflective material (18) on the cover medium (14) to scatter light travelling to and away from the cover medium (14).

* * * * *